(12) United States Patent
Hagano

(10) Patent No.: US 6,866,161 B2
(45) Date of Patent: Mar. 15, 2005

(54) FUELING DEVICE OF FUEL TANK

(75) Inventor: Hiroyuki Hagano, Aichi-ken (JP)

(73) Assignee: Toyoda Gosei Co., Ltd., Aichi-ken (JP)

(*) Notice: Subject to any disclaimer, the term of this patent is extended or adjusted under 35 U.S.C. 154(b) by 0 days.

(21) Appl. No.: 10/259,847

(22) Filed: Sep. 30, 2002

(65) Prior Publication Data

US 2003/0075543 A1 Apr. 24, 2003

(30) Foreign Application Priority Data

Oct. 3, 2001 (JP) ........................................ 2001-307824

(51) Int. Cl.[7] ............................................ B65D 43/18
(52) U.S. Cl. ........................ 220/259.1; 220/DIG. 33; 220/259.5; 220/281; 220/754; 220/345.6; 220/203.24; 220/203.28; 220/255; 220/326; 141/346; 141/350
(58) Field of Search .................. 220/203.24, 254.9, 220/255, 281, 321, 345.3, 345.6, 375, 259.5, 754, 326, 315, 318, 319, 256.1, 203.07, 86.2, DIG. 33, 259.1, 231; 215/208, 273–275; 141/350, 346

(56) References Cited

U.S. PATENT DOCUMENTS

| | | | | |
|---|---|---|---|---|
| 4,567,994 A | * | 2/1986 | Hofmann | 220/234 |
| 4,676,390 A | * | 6/1987 | Harris | 220/203.06 |
| 5,381,919 A | * | 1/1995 | Griffin et al. | 220/326 |
| 5,385,256 A | * | 1/1995 | Brown | 220/323 |
| 5,395,004 A | * | 3/1995 | Griffin et al. | 220/295 |
| 5,480,055 A | * | 1/1996 | Harris et al. | 220/203.26 |
| 5,520,300 A | * | 5/1996 | Griffin | 220/210 |
| 5,524,786 A | * | 6/1996 | Skudlarek | 220/262 |
| 6,095,363 A | * | 8/2000 | Harris et al. | 220/203.26 |
| 6,286,704 B1 | * | 9/2001 | Harris | 220/304 |
| 6,321,801 B1 | * | 11/2001 | Hagano et al. | 141/301 |
| 6,474,376 B2 | * | 11/2002 | Hagano et al. | 141/350 |
| 6,478,360 B1 | * | 11/2002 | Reutter | 296/97.22 |
| 2002/0074335 A1 | * | 6/2002 | Ono et al. | 220/304 |

* cited by examiner

Primary Examiner—Nathan J. Newhouse
Assistant Examiner—James Smalley
(74) Attorney, Agent, or Firm—Posz & Bethards, PLC

(57) ABSTRACT

A fueling device 10 of a fuel tank comprises a cover 20 which is provided with an operation lever 26 operated to open and close a filling opening SCc, and which opens and closes the filling opening SCc according to the opening/closing operation of the operation lever 26, a fuel cap 30 having a structure such that it is fitted in a buried state in an inlet pipe IP and taken out from the inlet pipe, a gasket GS interposed between the fuel cap 30 and the inner wall of inlet pipe IP, and a spring 70 interposed between the fuel cap 30 and gasket GS and pressing the gasket GS against the sealing surface by a force acting in the direction of closing the cover 20 via the fuel cap 30, while increasing the pressing force. The fueling device 10 has high sealing property against large external forces applied to the upper part of fuel filler pipe.

10 Claims, 17 Drawing Sheets

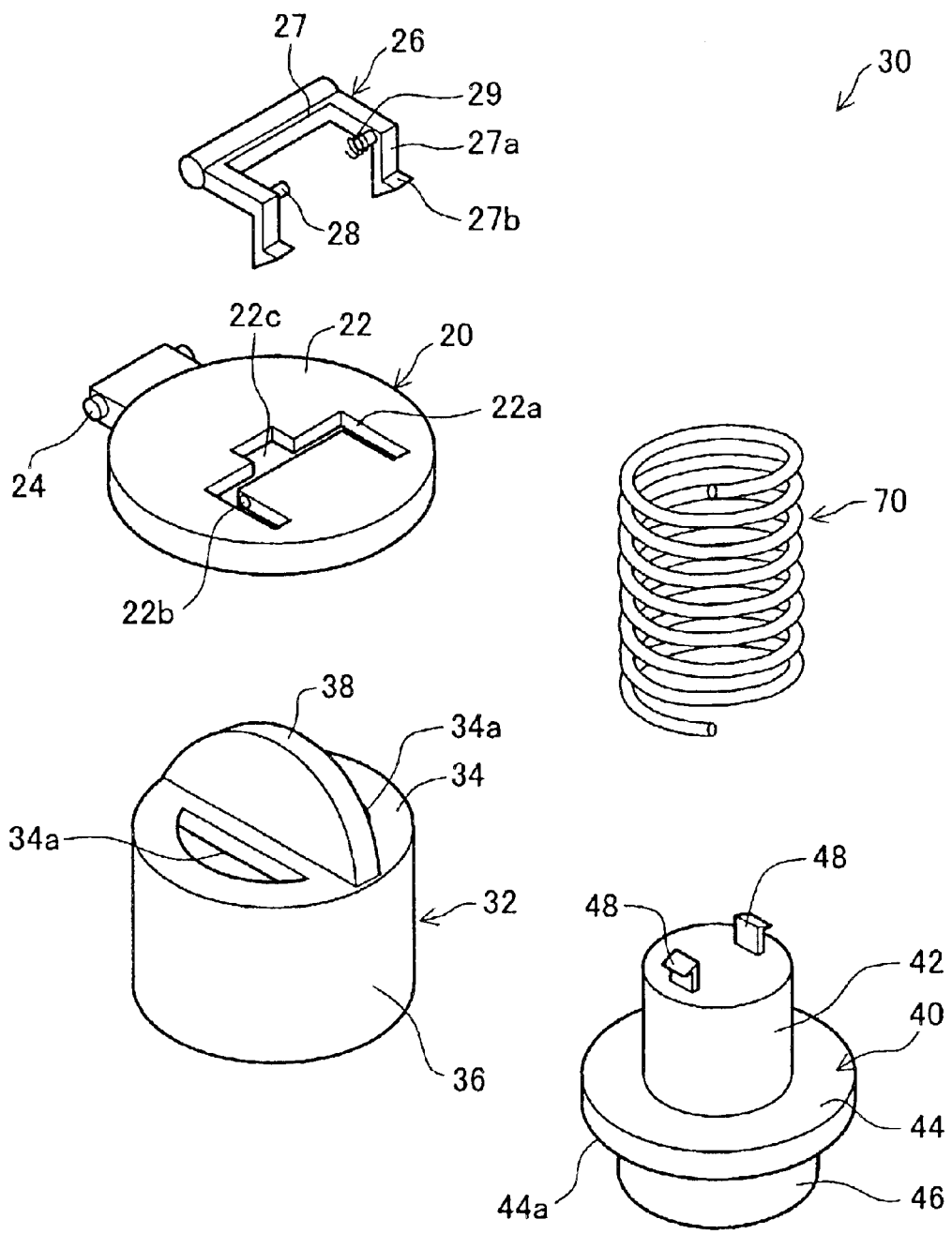
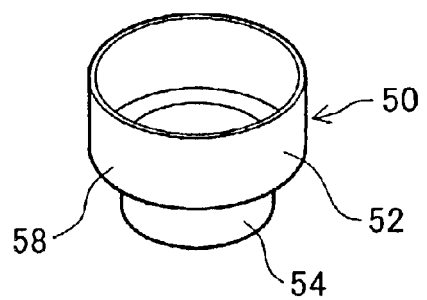

FUELING DEVICE OF FUEL TANK

This application claims the benefit of and priority from Japanese Application No. 2001-307824 filed Oct. 3, 2001, the content of which is incorporated herein by reference.

BACKGROUND OF THE INVENTION

1. Field of the Invention

The present invention relates to a fueling device for fueling a fuel tank through a passage of a fuel filler pipe.

2. Description of the Related Art

In conventional fueling devices for fueling a fuel tank through a filler pipe, the fuel cap is open when fuel is supplied through a fuel filler pipe. The fuel cap has a sealing member which, in a closed position, is inserted between the fuel cap and an inlet opening of the fuel filler pipe to prevent fuel vapor in the fuel tank from escaping into the atmosphere. The sealing member is in the form of a gasket extending around the periphery of a cylindrical casing main body. When the fuel cap is screwed onto the opening of the filling neck, the gasket provides air-tight sealing force, while subject to torque caused by rotating friction force, against the filling neck.

Applicant has found that such torque is not readily applied uniformly across the gasket as a whole, and complicates efforts to improve the sealing properties. Additionally, the gasket is removed with the fuel cap when the fuel cap is placed in the open position, resulting in stains and damage to the seal surface of the gasket. In such cases, not only are the sealing properties of the gasket compromised, but there is greater friction resistance with the gasket, tending to result in greater operating force required to open and close the fuel cap.

Furthermore, when a fueling gun is introduced into the inlet opening, the fueling gun strikes the inlet opening, damaging the seal in the opening in contact with the gasket. The sealing properties are compromised in this case as well due to possible damage to the gasket.

SUMMARY OF THE INVENTION

An object of the present invention is to provide a fueling device in which forces applied to the gasket are reduced, thereby increasing endurance, and which has tight sealing properties against large external forces applied to an upper portion of the fuel inlet pipe.

To solve this problem, an exemplary first embodiment of the present invention provides a fueling device for fueling a fuel tank through an inlet disposed in a fuel passage of a fuel inlet pipe. Thee fueling device comprises a cover having a handle being operable to open and close the inlet, the cover configured to open and close the inlet via operation of the handle, a cap configured to be detachably attached inside the inlet pipe, the cap being inserted as a whole in the inlet pipe and taken out of the fuel inlet pipe, a sealing component interposed between the cap and a seat surface inside the fuel inlet pipe. The cap is configured to press the sealing component against the seat surface when the cap is pressed by a closing force applied to the cover in a closing direction.

In the fueling device in accordance with the present invention, when the cover is opened by operating the handle provided on the cover, the cap can be taken out from inside the fuel filler pipe. Further, in a state in which the cap is attached inside the fuel filler pipe, the force closing the cover presses sealing component against the sealing surface of the fuel filler pipe via the cap, thus sealing the inside of the fuel tank from the atmosphere.

Filling can be conducted by opening the cover and pulling the cap up, and the operation of opening and closing the filling opening is facilitated because multiple rotation operations or large rotation torque, which were necessary to open the conventional caps, are not required.

Even when the upper portion of the fuel filler pipe is subjected to large external forces produced, for example, when the vehicle rolls over, the sealing property is not lost because the cap is buried in and protected by the fuel filler pipe.

Further, because sealing component is disposed inside the fuel filler pipe, the diameter thereof can be decreased by comparison with that of the structure in which it is attached on the outer periphery of the cap, as was explained with reference to the prior art technology. Therefore, the quantity of fuel evaporated from the gasket surface due to fuel-induced swelling of the gasket can be reduced.

Here, pressing mechanism, for example, an elastic member such as a spring, can be used between the cover and sealing component to employ the force which acts in the direction of closing the cover as the force pressing against sealing component. Alternatively, the same object can be attained by setting dimensions such that sealing component is pressed when the cover is closed. In this case, when a spring is used, setting the sealing force of sealing component by the pressing force of the spring makes it possible to obtain a stable sealing force, the pressing force of the spring being easily adjustable.

In the preferred embodiment of the present invention, a structure can be employed in which the cap comprises a cap upper body receiving the force acting in the direction of closing the cover and a cap lower body to which sealing component is attached, and the spring is disposed so as to transmit the force acting in the direction of closing the cap upper body to the cap lower body. The cap lower body can have a structure comprising a cap linking body for supporting the spring between the cap upper body and the cap lower body and for linking to the cap upper body so as to maintain the distance from the cap upper body within the prescribed range.

Further, in the preferred embodiment of the cover, it is a plate rotatably supported at one end thereof, and the cap upper body can have a structure comprising a push-down circular arc wall which is pressed by the cover, while sliding along the lower surface of the cover, so as to move the cap downward when the cover is opened and closed.

In the preferred embodiment of the operation member, it can have a structure comprising an operation lever constructed so that the cover is set in a closed position against the pressing force of the spring by coupling with the fuel filler pipe and the cover is set in an open position by the pressing force of the spring when the coupling is released by the opening operation.

The cap can have a structure comprising a valve chamber composed of the cap lower body and the cap linking body and a pressure regulating valve accommodated inside the valve chamber for adjusting the pressure inside the tank.

In another preferred embodiment of the present invention, the cap can have a structure comprising a cap upper body receiving a force acting in the direction of closing the cover and a cap lower body supporting sealing component and further comprising a spring inserted between the cap upper body and cap lower body and producing a force acting in the direction of closing the cover so that sealing component is pressed against the sealing surface and an engaging ring comprising engaging portions which engage with and disengage from the fuel filler pipe by moving in response to the movement of the cap upper body, this engaging ring being set in a sealing position in which sealing component is pressed by the pressing force of the spring when the cover is closed and a release position in which the sealing position is released when the cover is opened.

In the preferred embodiment of the engaging ring, it can comprise linking arms that link the engaging portions so as to obtain a loop shape and can have a structure such that the engaging portions are engaged with and disengaged from the fuel filler pipe by the deformation of the loop shape when the cap body is moved.

The cover is formed from an elastic member which is held in an intimate contact with the filling opening by elastic deformation when the filling opening of fuel filler pipe is closed. In this case, the cover can have a structure such as to be held in a state of intimate contact with the filling opening when the cap upper body is pressed and the engaging ring is set in a sealing position.

Further, in the preferred embodiment of the present invention, a structure can be employed in which the fueling device comprises a support inner cylinder attached inside the fuel filler pipe and supporting the cap and this support inner cylinder has a sealing member attached thereto. With such a structure, if the support inner cylinder is taken out of the fuel filler pipe, the sealing member can be removed together with the support inner cylinder and maintenance of the sealing member can be facilitated.

BRIEF DESCRIPTION OF THE DRAWINGS

FIG. 3 is an exploded perspective view illustrating the periphery of a cover and a fuel cap;

DESCRIPTION OF THE PREFERRED EMBODIMENTS

A. First Embodiment (1) Schematic Structure of Fueling Device 10

Figure 1:
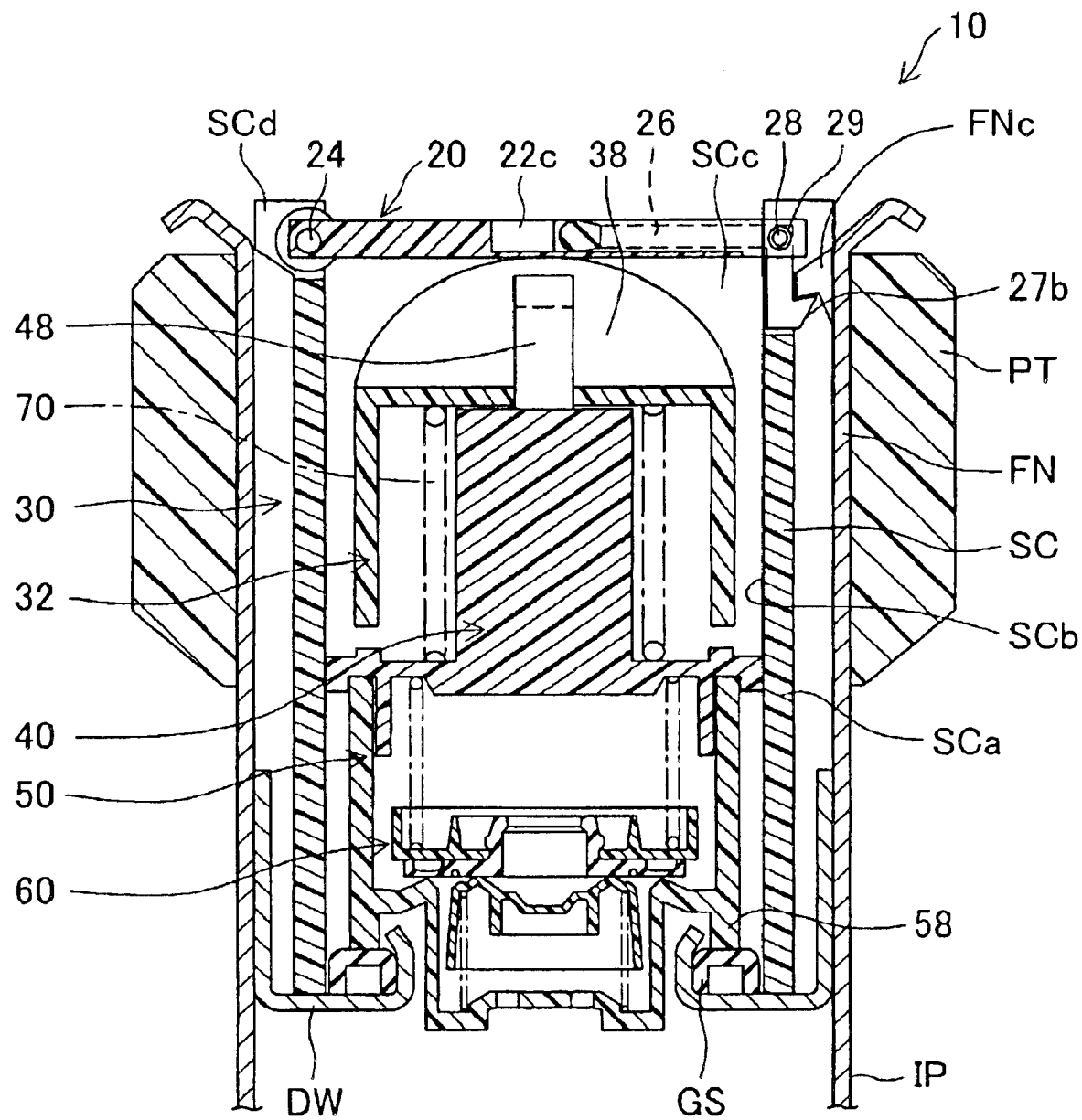
FIG. 1 is a cross-sectional view showing a fueling device of an automobile fuel tank in accordance with a first embodiment of the present invention.
Figure 2:
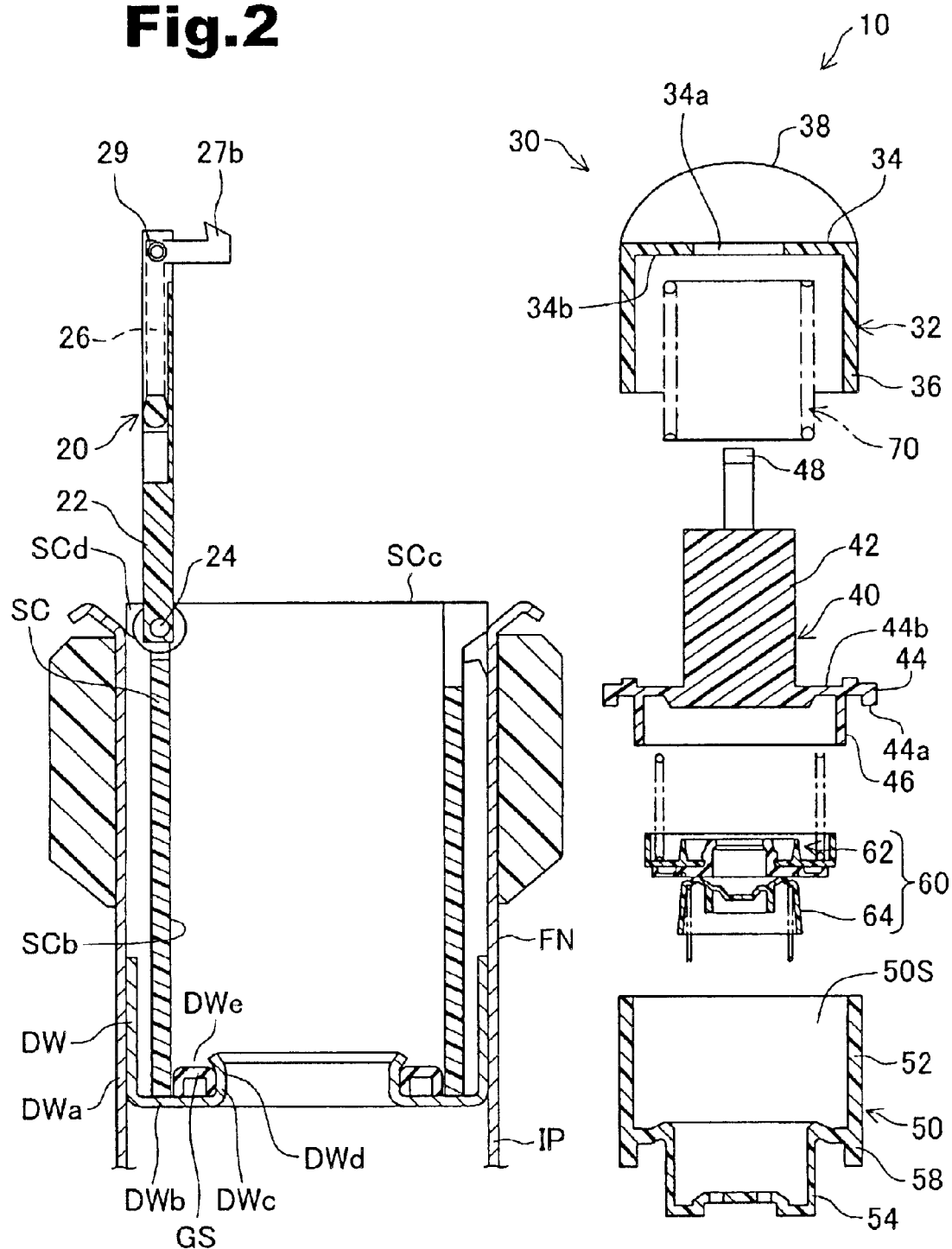
FIG. 2 is an exploded cross-sectional view of the fueling device.

FIG. 1 is a cross-sectional view of a fueling device 10 of an automobile fuel tank of a first embodiment of the present invention. FIG. 2 is an exploded cross-sectional view of fueling device 10. FIG. 3 is an exploded perspective view illustrating the periphery of a cover 20 and a fuel cap 30. The fueling device 10 of the fuel tank is installed on an inlet pipe IP connected to a tank body (not shown in the figures), comprises the cover 20, the fuel cap 30, and a gasket GS, and is constructed so that the fuel cap 30 can be attached to and detached from a support inner cylinder SC attached inside the inlet pipe IP. Fuel filling is conducted by opening the cover 20 and removing the fuel cap 30 from the support inner cylinder SC.

(2) Structure of Inlet Pipe IP and the Support Inner Cylinder SC

Figure 4:
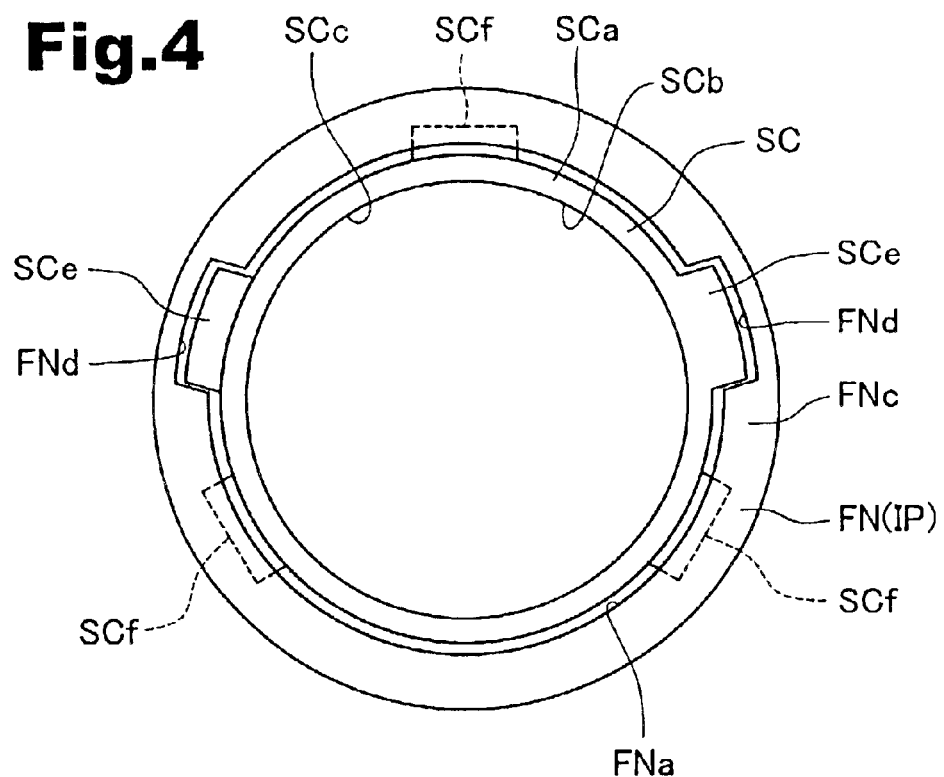
FIG. 4 shows the state in which a support inner cylinder is attached to an inlet pipe, as seen viewed from above.
Figure 5:
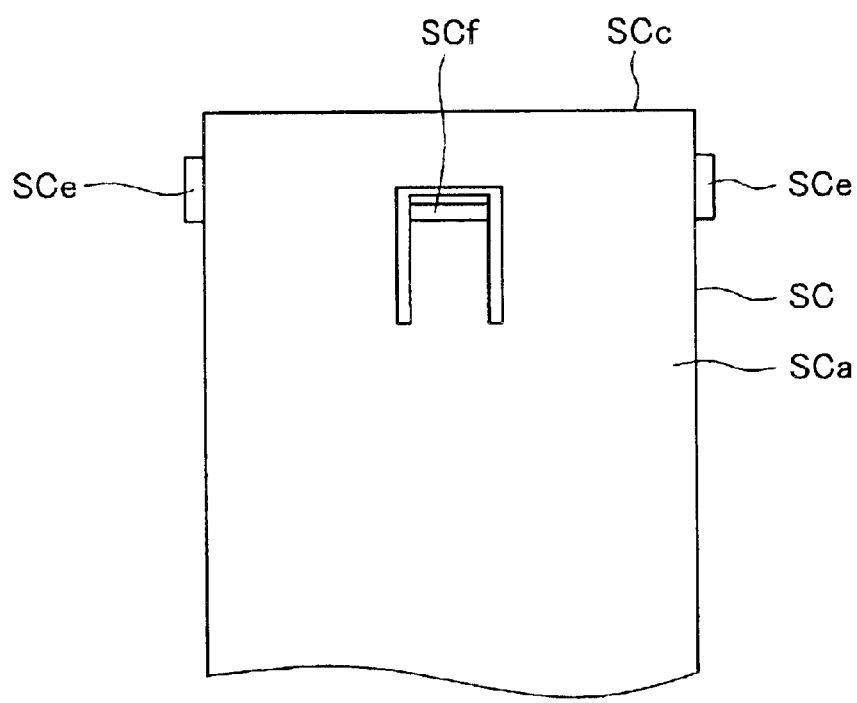
FIG. 5 is a side view of the support inner cylinder.

FIG. 4 is a plane view illustrating the state in which the support inner cylinder SC is attached to the inlet pipe IP. FIG. 5 is a side view of the support inner cylinder SC. The upper part of inlet pipe IP serves as a filler neck FN having an accommodation space FNa. A ring-shaped locking projection FNc is formed on the inner wall of the filler neck FN. The locking projection FNc is a projection for preventing the support inner cylinder SC from being pulled out. A guide notch FNd is formed in part of locking projection FNc. The guide notch FNd serves for inserting and positioning the support inner cylinder SC.

As shown in FIG. 1, the support inner cylinder SC comprises an inner cylindrical body SCa with an accommodation space SCb for accommodating the fuel cap 30. The upper part of the inner cylindrical body SCa serves as a filling opening SCc. The upper part of inner cylindrical body SCa along the outer periphery of filling opening SCc serves as a support opening edge SCd for mounting the cover 20. A tubular protector PT for protecting the filler neck FN from external forces is attached around the filler neck FN.

As shown in FIGS. 4 and 5, guide projections SCe, SCe are provided in two places in the longitudinal direction on the outer periphery of the inner cylindrical body SCa. The guide projections SCe, SCe are formed such as to be inserted and positioned in the guide notches FNd, FNd of filler neck FN. Further, catches SCf are formed in three places on the outer periphery of the support inner cylinder SC. The catches SCf are formed such that moving the catches SCf over the locking projection FNc of the filler neck FN locks the support inner cylinder SC with respect to the filler neck FN. With such a structure, when the guide projections SCe, SCe are positioned in the guide notches FNd, and the support inner cylinder SC is inserted into the inlet pipe IP, the catches SCf will move over and engage with the locking projection FNc, thereby fixing the support inner cylinder SC inside the inlet pipe IP.

(3) Structure of Dividing Wall DW

Referring to FIG. 2, a dividing wall DW is fixed to the lower inner wall of the filler neck FN. The dividing wall DW comprises a mounting side wall DWa for fixing to the inner wall of the filler neck FN, a horizontal wall DWb formed by bending the lower edge of the mounting side wall DWa in the horizontal direction, and a guide wall DWc obtained by bending the inner peripheral portion of the horizontal wall DWb upward, and all those walls are formed integrally. The inside of the guide wall DWc serves as an insertion hole DWd for inserting a filling gun. Further, space on the outer periphery of the guide wall DWc serves as a seal retainer DWe and retains the gasket GS.

(4) Structure of Cover 20 (Operation Part)

The cover 20 shown in FIG. 2 opens and closes the filling opening SCc and comprises a disk-shaped cover main body 22. The cover main body 22 is rotatably supported at the edge thereof by the support shaft 24 on the support opening edge SCd of the support inner cylinder SC. As shown in FIG. 3, the cover 20 comprises an operation lever 26. The operation lever 26 comprises a U-shaped lever main body 27 and a spring 29. Engaging legs 27a are formed in the parallel and orthogonal directions on both ends of the lever main body 27. The distal ends of the engaging legs 27a serve as acute-angle engaging catches 27b. The operation lever 26 is provided so that the operation lever 26 can be accommodated in a lever accommodation hole 22a formed on the cover main body 22, rotatably supported with respect to the cover 20 by inserting the rotation shaft 28 into the shaft hole 22b, and impelled by the spring 29 in the direction of returning to the original position. Further, an operation hole 22c for inserting a finger to facilitate the operation of operation lever 26 is connected to the lever accommodation hole 22a. With such a structure, when the operation lever 26 is rotated about the rotation shaft 28 by inserting a finger into the operation hole 22c and pulling up the operation lever 26, the engaging catch 27b shown in FIG. 1 will come off the locking projection FNc of the filler neck FN, and when the operation lever 26 is further pulled up, the cover 20 rotates around the support shaft 24 and the filling opening SCc is opened.

(5) Structure of Fuel Cap 30

As shown in FIG. 2, the fuel cap 30 is accommodated in the accommodation space SCb of the support inner cylinder SC and thereby brought in intimate contact with the gasket GS. The fuel cap 30 comprises a cap upper body 32, a cap linking body 40, a cap lower body 50, a pressure regulating valve 60, and a spring 70.

As shown in FIG. 3, the cap upper body 32 is a cylindrical body surrounded by an upper wall 34 and a cylindrical wall 36. A push-down circular arc wall 38 is formed as a semicircular plate on the upper surface of upper wall 34. The push-down circular arc wall 38 is formed such that it can be pressed along the inner surface of the cover 20 and the fuel cap 30 can be lifted up with a finger. Further, insertion holes 34a, 34a are formed on both sides of the push-down circular arc wall 38 in the upper wall 34. The insertion holes 34a, 34a are for connecting to the cap linking body 40.

The cap linking body 40 comprises a columnar linking main body 42. A flange 44 is formed at the lower end of the linking main body 42. A ring-shaped protrusion 46 for positioning the cap lower body 50 is provided on the lower surface of the flange 44. Engaging catches 48, 48 are provided on the upper surface of the linking main body 42 so as to protrude therefrom. The engaging catches 48, 48 are formed so as to pass through the respective insertion holes 34a, 34a of the cap upper body 32 and engage with the upper surface of upper wall 34.

The cap lower body 50 is a component linked to the cap linking body 40 and used for pressing against the gasket GS. Thus, the cap lower body 50 comprises a large-diameter cylinder 52 and a small-diameter cylinder 54 formed integrally with the lower part of large-diameter cylinder 52. The large-diameter cylinder 52 is integrated with the cap linking body 40 by mating the ring-shaped protrusion 46 of the cap linking body 40 and welding the upper end of large-diameter cylinder 52 to the welded edge 44a of the flange 44. The lower end of large-diameter cylinder 52 serves as a sealing edge 58 for pressing the gasket GS shown in FIG. 2.

The pressure regulating valve 60 shown in FIG. 2 is accommodated in a valve chamber 50S located inside the cap lower body 50. The pressure regulating valve 60 is a pressure valve for maintaining the pressure inside the tank within the prescribed range with respect to the atmospheric pressure and comprises a positive pressure valve 62 and a negative pressure valve 64.

A spring 70 is fit between the cap upper body 32 and the cap linking body 40. Thus, as shown in FIG. 2, the spring 70 is fit between the spring-receiving surface 34b of the cap upper body 32 and a spring-receiving surface 44b of the flange 44 of the cap linking body 40. When the cap upper body 32 is pressed down by the cover 20, the engaging catches 48, 48 move into the insertion holes 34a, 34a. As a result, as the cap upper body 32 moves downward, the spacing between the cap upper body 32 and the cap lower body 50 is reduced and the gasket GS is pressed by the spring 70 via the cap linking body 40 and the cap lower body 50.

(6) Sealing Action of Fueling Device 10

In a state in which the filling opening SCc shown in FIG. 1 is closed, because the operation lever 26 of cover 20 is in a closed position, the engaging catch 27b of operation lever 26 is engaged with the locking projection FNc of the filler neck FN and the cover 20 is closed. The lower surface of cover 20 applies pressure to the push-down circular arc wall 38 of the fuel cap 30 and then presses the cap linking body 40 and the cap lower body 50 downward via the spring 70. The sealing edge 58 of the lower end of cap lower body 50 is pressed against the gasket GS. Thus, the cover 20 seals the inner space of the dividing wall DW from the atmosphere by pressing the gasket GS. Here, if the difference between the pressure inside the tank and atmospheric pressure exceeds the prescribed value, the pressure regulating valve 60 adjusts the pressure to within the prescribed range.

(7) Fueling Operation

Figure 6:
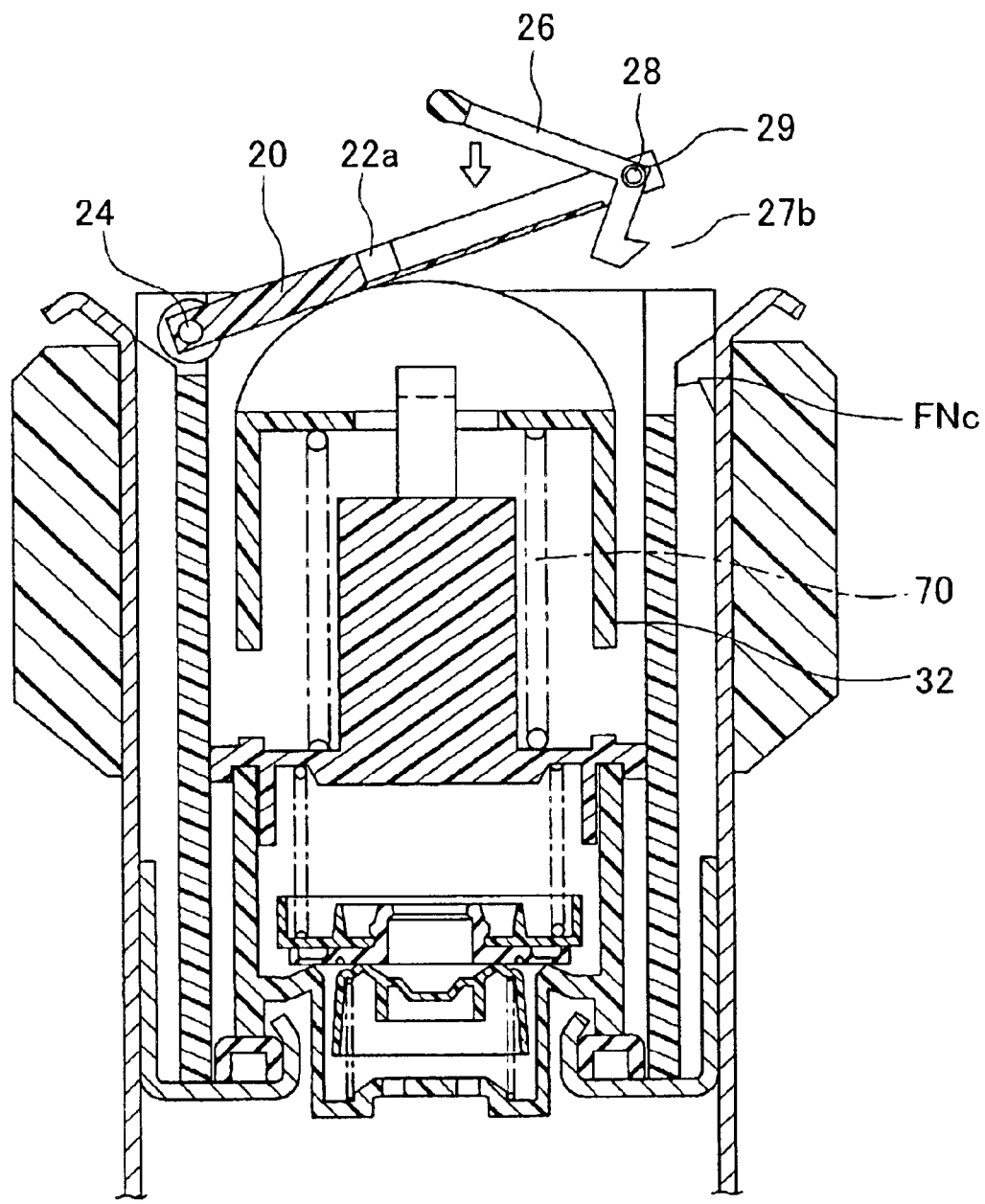
FIG. 6 shows the fueling operation of the fueling device.
Figure 7:
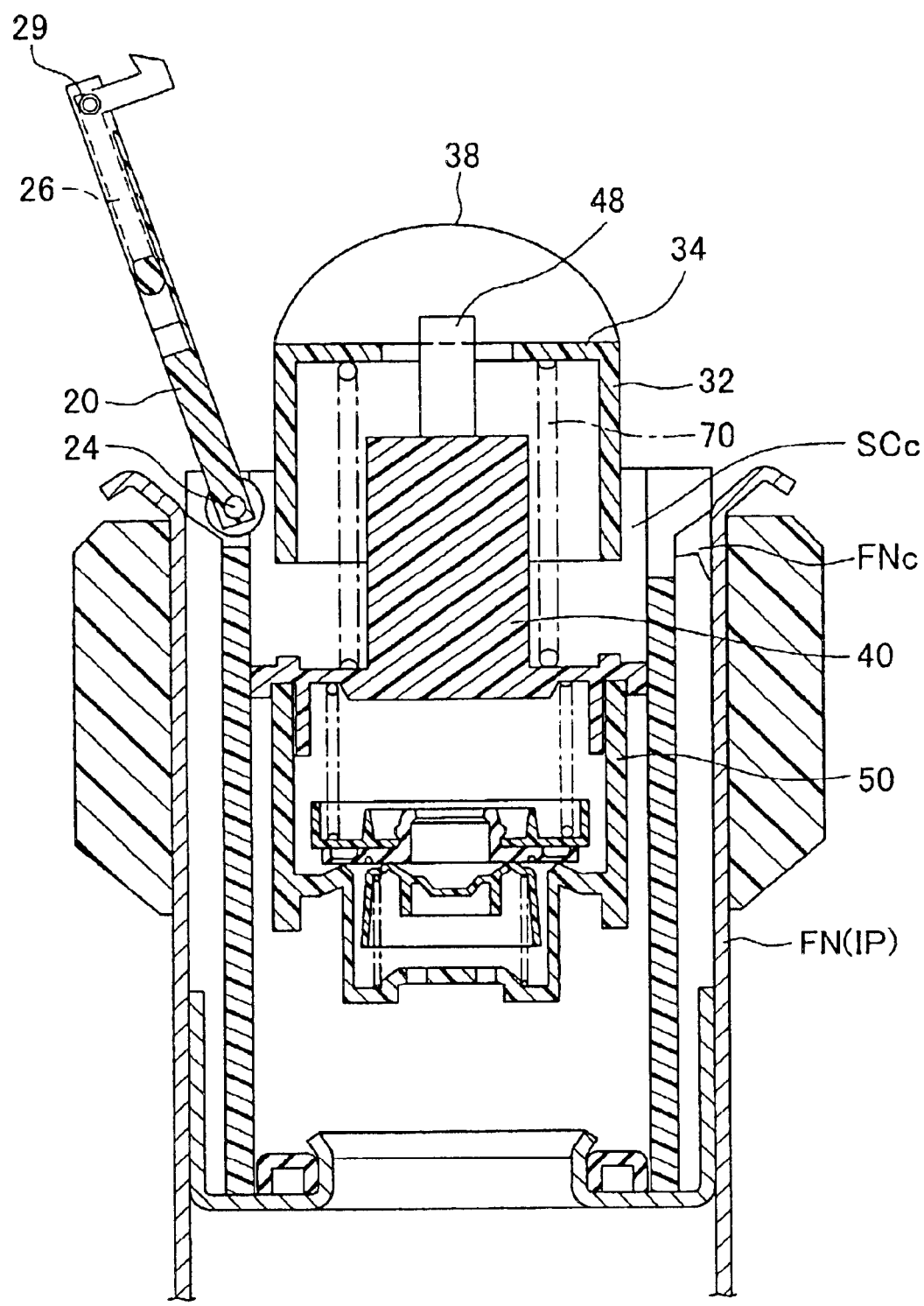
FIG. 7 shows a step subsequent to that of FIG. 6.
Figure 8:
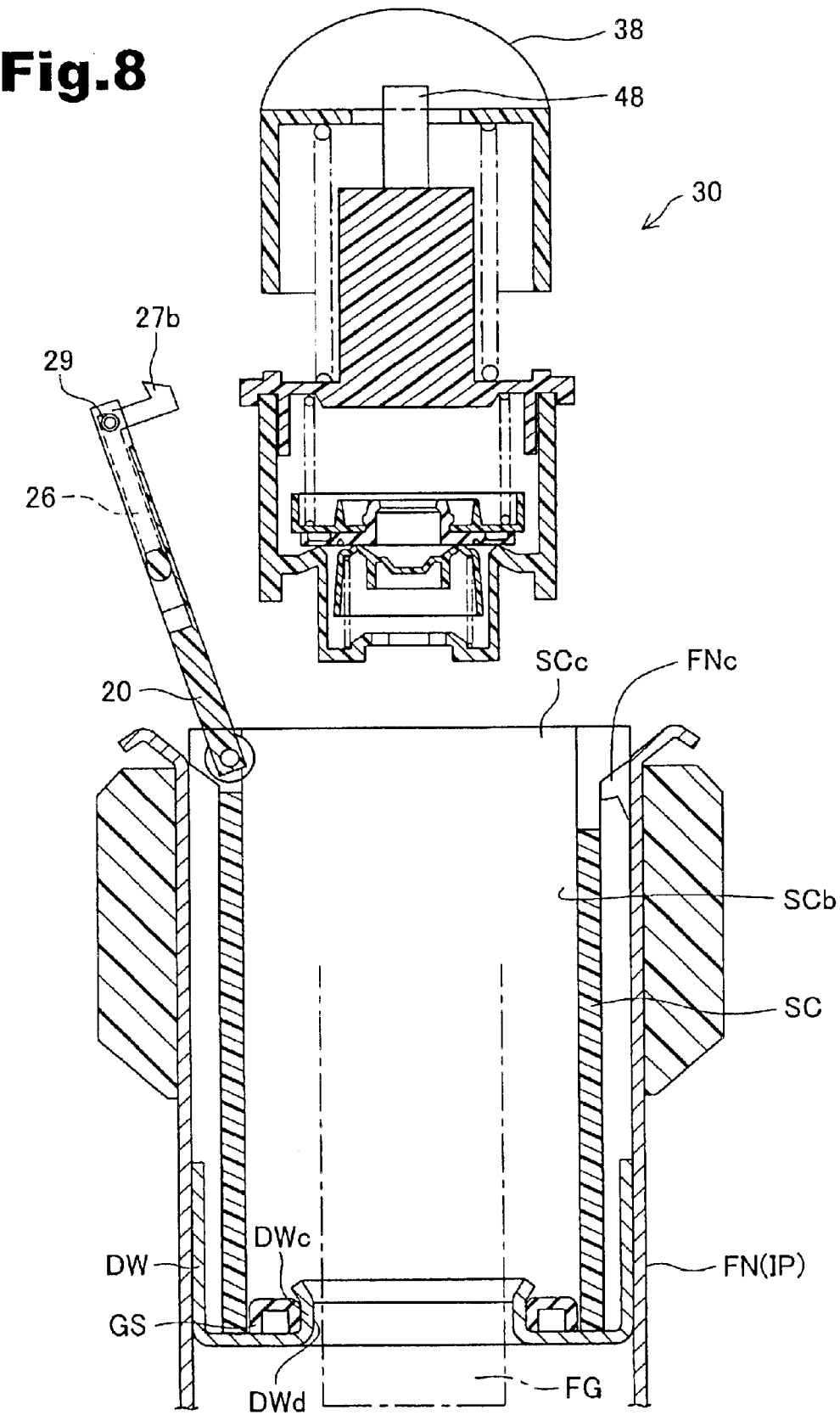
FIG. 8 shows a step subsequent to that of FIG. 7.

FIGS. 6 through 8 illustrate the fueling operation. As shown in FIG. 6, the operation lever 26 is rotated in order to open the cover 20. Thus, a finger is inserted into the operation hole 22c and the operation lever 26 is pulled up. Because the operation lever 26 rotates clockwise, as shown in the figure, about the rotation shaft 28, the engaging catch 27b is disengaged from the locking projection FNc. When the operation lever 26 is further pulled up, as shown in FIG. 7, the cover 20 is rotated about the support shaft 24 and opened. When the finger is taken off the operation lever 26, the operation lever 26 is returned to the original position by the spring 29.

When the pushing force of the cap upper body 32 created by the cover 20 is released, the spring 70 pushes the cap upper body 32 upward. As a result, the cap upper body 32 moves upward and the push-down circular arc wall 38 is exposed from above the filling opening SCc. If the push-down circular arc wall 38 is pulled up with a finger, the engaging catch 48 of the cap linking body 40 is engaged with the upper wall 34 of the cap upper body 32. When the push-down circular arc wall 38 is further pulled up, the cap linking body 40 and the cap lower body 50 also move as a unit. The fuel cap 30 is thereby removed to the outside of the inlet pipe IP (state shown in FIG. 8).

A filling gun FG is then inserted through the filling opening SCc to fill the tank. At this time, the filling gun is guided by the guide wall DWc of the dividing wall DW into the insertion hole DWd. Since the gasket GS is surrounded by the guide wall DWc, it is not damaged by the filling gun.

Upon completion of filling, the following operations are conducted. Thus, once the filling gun has been pulled out, the fuel cap 30 is inserted into the accommodation space SCb, the cover 20 is closed, and the operation lever 26 is rotated counterclockwise, as shown in the figure, to engage the engaging catch 27b with the engaging catch SCf. As a result, the push-down circular arc wall 38 is pushed down by the lower surface of the cover 20, the cap linking body 40 and the cap lower body 50 are pushed down via the spring 70, and the sealing edge 58 is pushed against the gasket GS. Therefore the fuel cap 30 and the gasket GS are sealed and the state shown in FIG. 1 is restored.

(8) Effect of the Operation of Fueling Device 10

Filling can be conducted by opening the cover 20 and pulling up the fuel cap 30, and multiple rotation operations or a large rotation torque, which were required to open the conventional fuel cap, are unnecessary. Therefore, opening and closing of the filling opening SCc are facilitated.

Because the fuel cap 30 is accommodated and protected inside the filler neck FN, even when a large external force produced, for example, when the vehicle rolls over, is applied to the upper part of filler neck FN, sealing property is not lost.

Since the gasket GS is disposed inside the support inner cylinder SC, the diameter of the gasket GS can be reduced by comparison with the structure in which the gasket is installed on the outer periphery of fuel cap, as explained with reference to the prior art technology. Therefore, the amount of fuel evaporated from the surface of the gasket GS due to fuel-induced expansion of the gasket GS can be reduced.

The gasket GS receives only a uniform downward compressive force at the sealing edge 58 due to the pressing force of spring 70 and receives no twisting forces as in the prior art structures. Therefore, a uniform sealing force can be obtained and the gasket has excellent durability.

B. Second Embodiment (1) Schematic Structure

Figure 9:
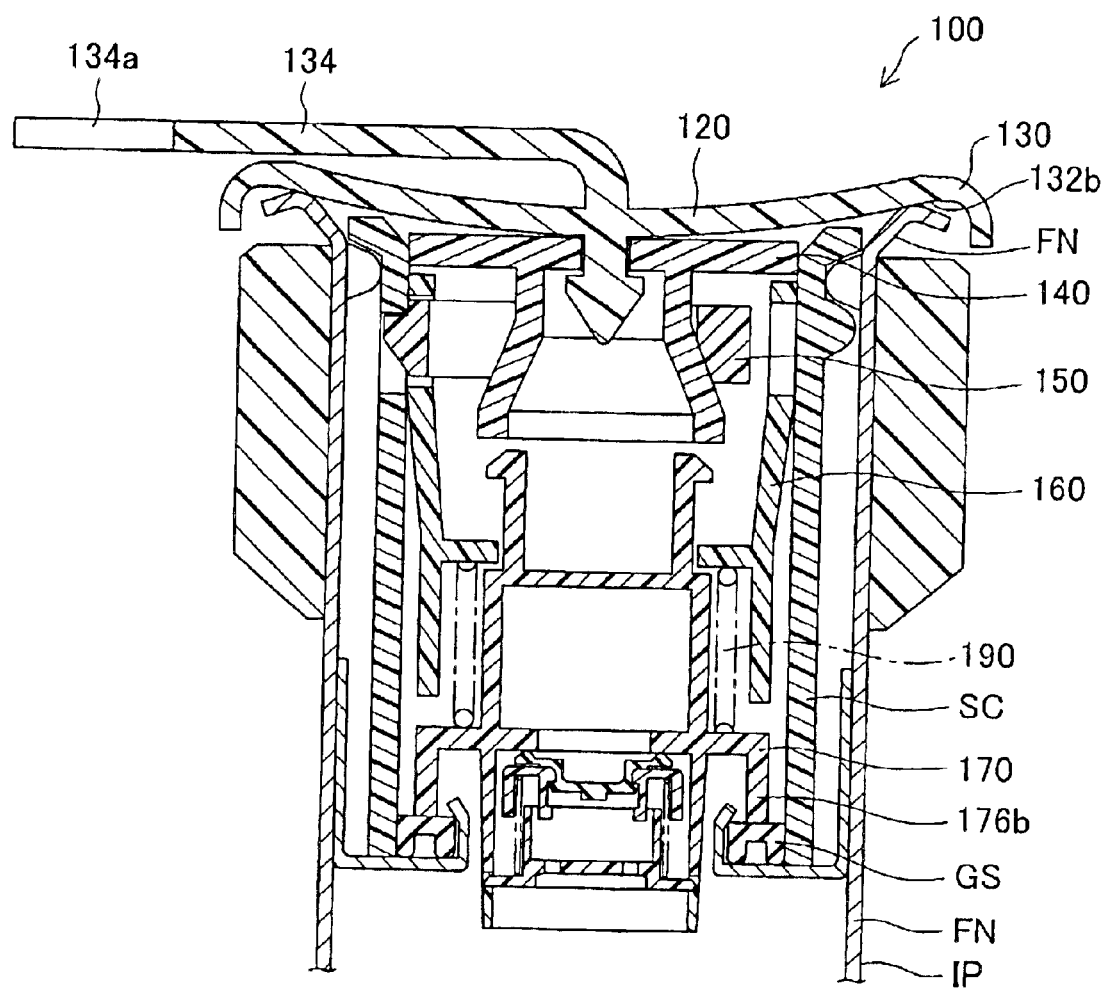
FIG. 9 is a cross-sectional view of a fueling device in accordance with a second embodiment of the present invention.
Figure 10:
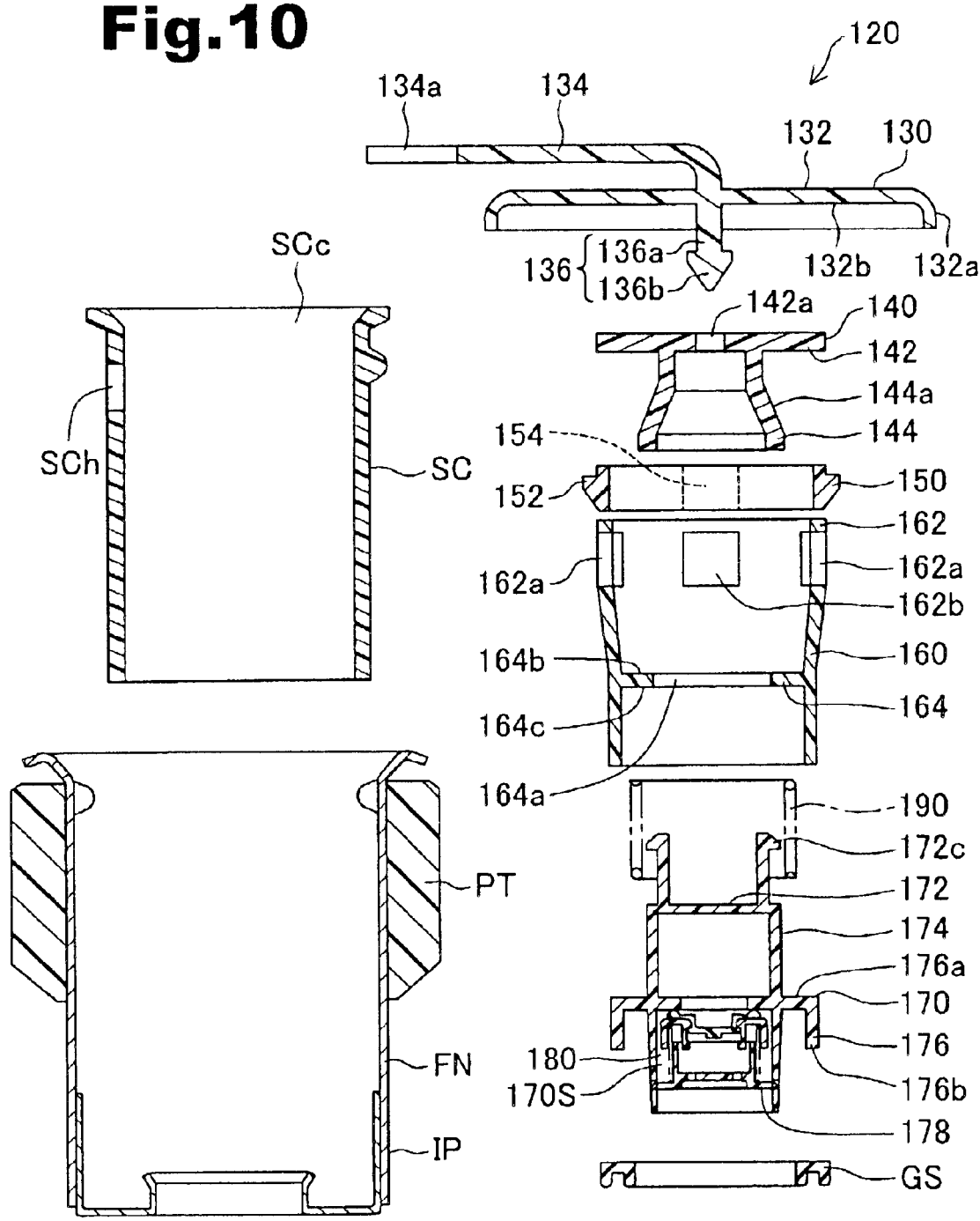
FIG. 10 is an exploded cross-sectional view of the fueling device of the second embodiment.

FIG. 9 is a cross-sectional view of a fueling device 100 of the second embodiment. FIG. 10 is an exploded cross-sectional view of the fueling device 100. The specific feature of the structure of the second embodiment is that the fuel cap 120, including the cover 130, can be attached to and detached from the support inner cylinder SC.

(2) Schematic Structure of Fuel Cap 120

The fuel cap 120 comprises a cover 130, a cap upper body 140, an engaging ring 150, a cap linking body 160, a cap lower body 170, and a spring 190 and has a structure such that the fuel cap 120, including the cover 130, can be attached to and detached from a support inner cylinder SC. FIG. 9 shows a cross section cut at an angle of 90 degree to facilitate the understanding of the operation of engaging ring 150.

(3) Structure of Cover 130

As shown in FIG. 10, the cover 130 is integrally molded from a flexible resin and comprises a disk-shaped cover main body 132, a handle 134, and a lift projection 136. The outer periphery of the cover main body 132 serves as an outer peripheral projection 132a surrounding the upper peripheral edge of the filler neck FN. A sealing surface 132b of the cover main body 132 is brought into intimate contact with the upper peripheral edge of the filler neck FN by applying pressure thereto (see FIG. 9).

Figure 11:
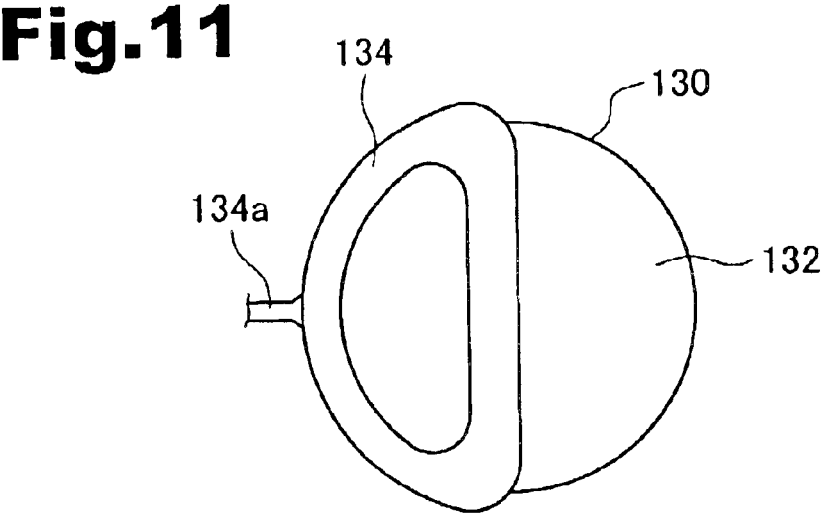
FIG. 11 is a plan view of a cover.

FIG. 11 is a plane view of the cover 130. The handle 134 is provided in a protruding condition in the center of the upper surface of the cover 130. The handle 134 is formed to be flexible so that it can be raised by hand from the horizontal position shown in FIG. 13 to the vertical position shown in FIG. 14. A tether 134a is formed integrally with the upper part of the handle 134 shown in FIG. 10. The other end of the tether 134a is fixed to the filling lid (not shown in the figures). The tether 134a prevents the fuel cap 120 from being lost during filling. A lift projection 136 is provided in a protruding condition in the center of the lower surface of the cover 130. The lift projection 136 comprises a connecting rod 136a and a conical engaging portion 136b formed integrally with the end of the connecting rod 136a, and pulls up the cap upper body 140.

(4) Structure of Cap Upper Body 140

The cap upper body 140 comprises an upper plate 142 and a side wall 144 protruding from the lower surface of the upper plate 142 and has a pedestal shape. A through hole 142a is formed in the center of the upper plate 142. The through hole 142a is provided for inserting the conical engaging portion 136b of the lift projection 136 under pressure and engaging therewith. In the coupled state, the cap upper body 140 can be pulled up by the cover 130 via the lift projection 136. The side wall 144 comprises a tapered surface 144a expanding in the downward direction. The tapered surface 144a, as described below, causes the deformation of the engaging ring 150 as the cover 130 is pulled up.

(5) Structure of Engaging Ring 150

Figure 12:
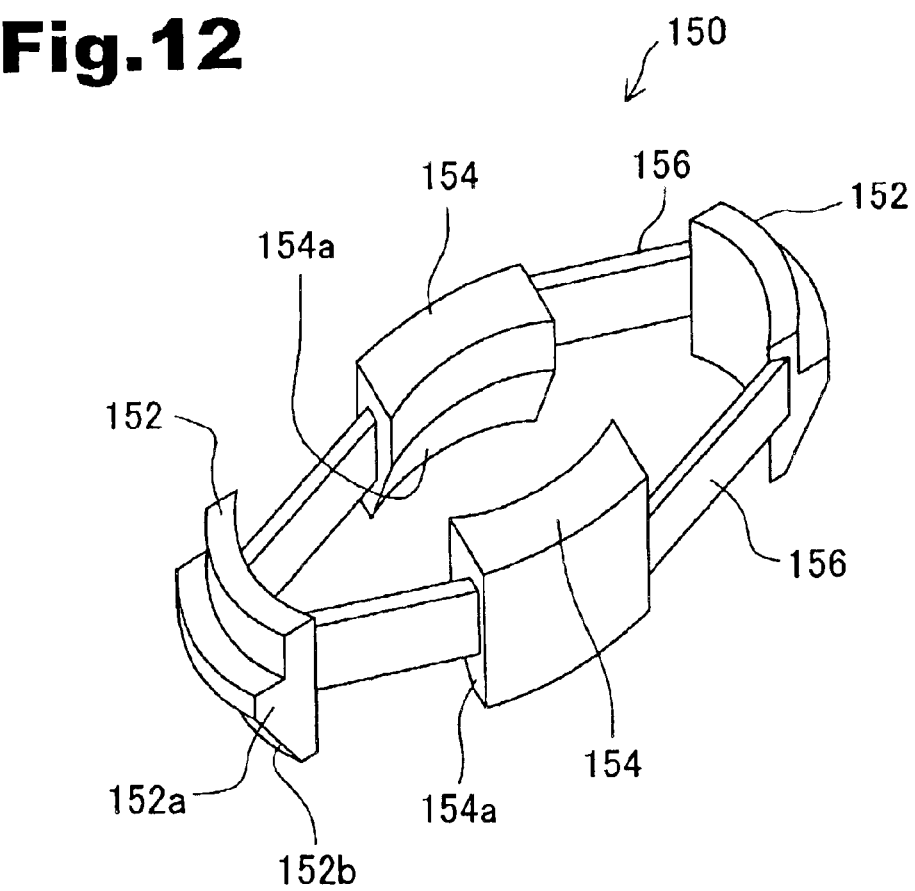
FIG. 12 is a perspective view of an engaging ring.

FIG. 12 is a perspective view of the engaging ring 150. The engaging ring 150 comprises engaging ends 152, 152 and pushing ends 154, 154 and is formed by linking the ends with a linking arm 156 so that the elliptical shape of the engaging ring 150 is restored under an elastic force. The engaging ends 152, 152 and pushing ends 154, 154 are the components formed for engaging with the cap linking body 160. Further, the outer peripheral engaging projections 152a are formed on the outer periphery of the engaging ends 152, 152 for engagement with the engaging holes SCh of the support inner cylinder SC shown in FIG. 10. The outer peripheral lower surface of the outer peripheral engaging projection 152a is a tapered surface 152b to facilitate the engagement with the engaging hole SCh.

(6) Structure of Cap Linking Body 160

Referring again to FIG. 10, the cap linking body 160 comprises a linking tubular body 162 whose diameter slightly decreases in the downward direction engaging holes 162a, 162a for engaging with the engaging ends 152, 152 of the engaging ring 150 and pushing holes 162b, 162b (only one of them is shown in the figure) for engaging with the pushing ends 154, 154 are formed on the linking tubular body 162. A partition 164 is formed inside the linking tubular body 162. A through hole 164a for engaging with the cap lower body 170, is formed in the center of the partition 164, and a joining surface 164b and a spring receiving surface 164c are formed on the upper and lower surface of the partition 164, respectively.

(7) Structure of Cap Lower Body 170

The cap lower body 170 comprises an upper wall 172, a small-diameter tubular body 174 extending cylindrically from the outer periphery of the upper wall 172, and a large-diameter tubular body 176 extending from the outer periphery of the small-diameter tubular body 174. The lower opening of the cap lower body 170 is closed with a lower lid 178. The lower end of the large-diameter tubular body 176 serves as a sealing edge 176b for pressing against the gasket GS. The outer upper surface of the large-diameter tubular body 176 serves as a spring receiving surface 176a, and the spring 190 is fit between the spring receiving surface 176a and the spring receiving surface 164c of cap linking body 160. The spring 190 impels the cap lower body 170 downward.

(8) Structure of Pressure Regulating Valve 180

The space inside the cap lower body 170 serves as a valve chamber 170S, and a pressure regulating valve 180 for adjusting the pressure inside the fuel tank is accommodated in the valve chamber 170S. The pressure regulating valve 180 is opened and closed when the difference between the pressure inside the tank and atmospheric pressure exceeds the prescribed value, thereby maintaining the pressure inside the tank within the prescribed range.

(9) Sealing Action of Fueling Device 100

Figure 13:
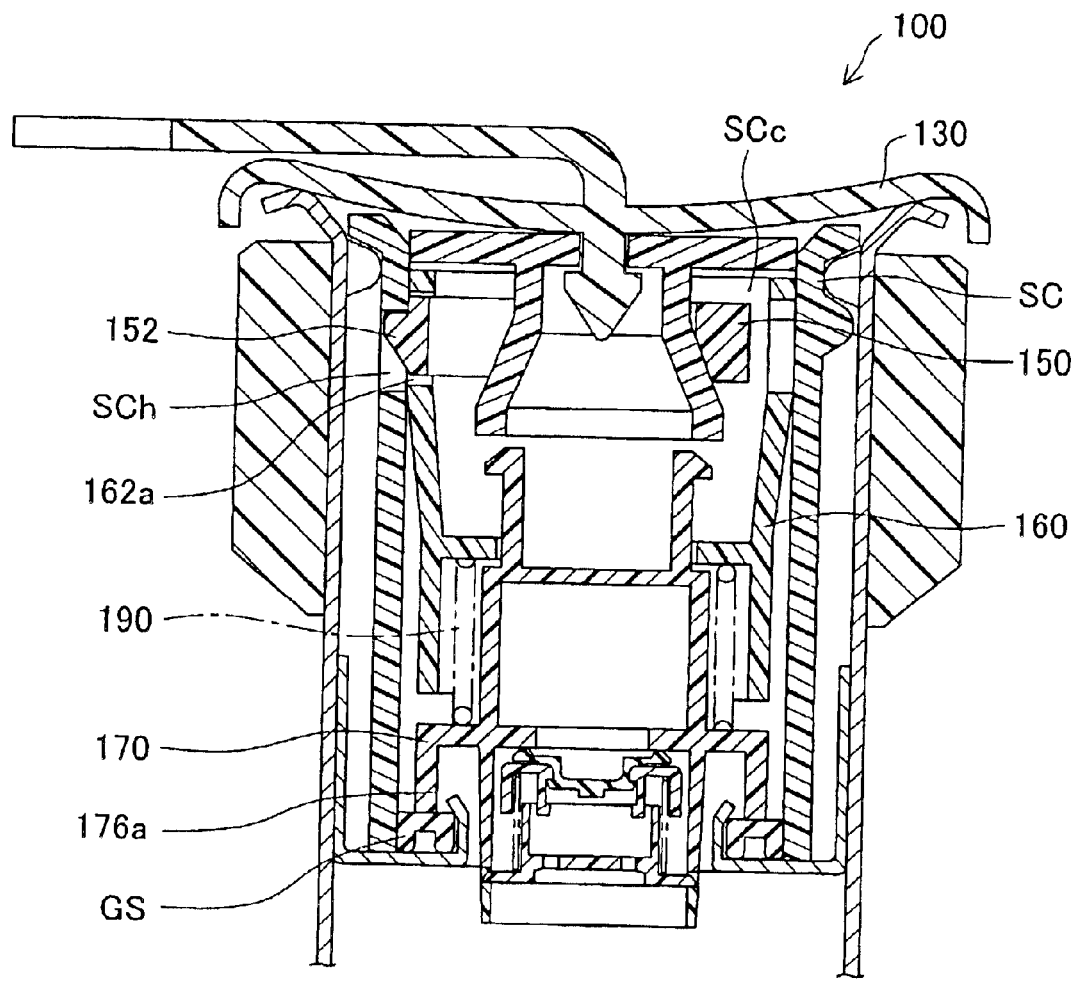
FIG. 13 shows the fueling operation of the fueling device of the second embodiment.
Figure 14:
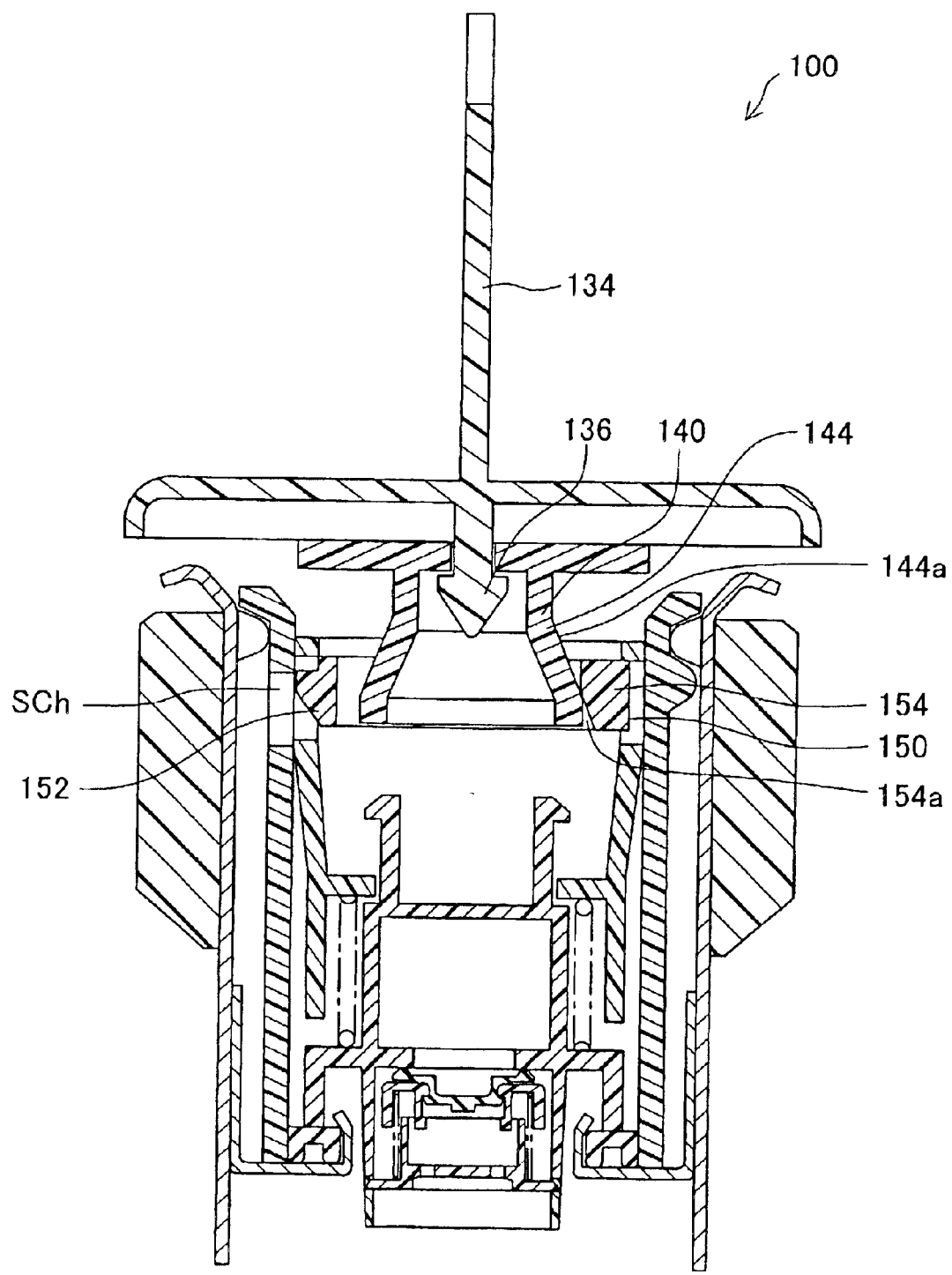
FIG. 14 shows a step subsequent to that of FIG. 13.
Figure 15:
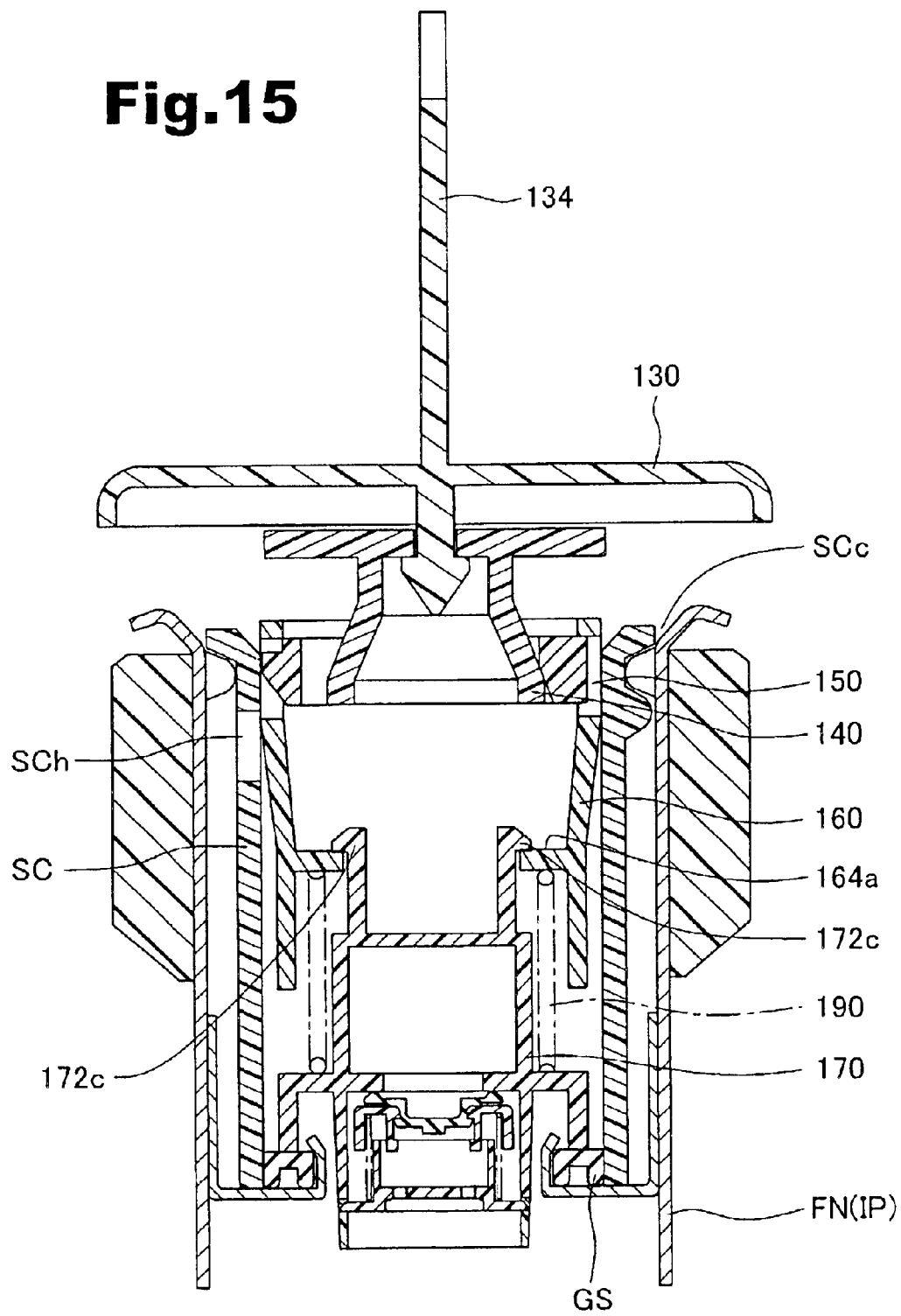
FIG. 15 shows a step subsequent to that of FIG. 14.

Sealing action of fueling device 100 will be described with reference to FIGS. 13 through 15. FIGS. 13 through 15 are cross-sectional views which are 90 degree-unfold to facilitate the understanding of the operation of engaging ring 150. As shown in FIG. 13, in a state in which the filling opening SCc is closed, the central part of cover 130 is inserted and deflected. Moreover, the engaging ends 152 of engaging ring 150 have passed through the engaging holes 162a and engaged with the engaging holes SCh of support inner cylinder SC. As a result, because the cap linking body 160 is fixed to the support inner cylinder SC, the cap linking body 160 moves the cap lower body 170 downward via the spring 190, and the sealing edge 176b presses the gasket GS, thereby sealing space between the sealing edge 176b and the gasket GS.

(10) Fueling Operation

As shown in FIG. 14, when the handle 134 is raised in the vertical position and pulled up, the cap upper body 140 moves upward because the lift projection 136 is engaged with the cap upper body 140. As a result of such upward movement of cap upper body 140, the tapered surface 144a of the side wall 144 presses the tapered surfaces 154a of the pushing ends 154 of the engaging ring 150, thereby increasing the spacing between the pushing ends 154, 154 and decreasing the spacing between the engaging ends 152, 152. In other words, the shape of the engaging ring 150 becomes close to a circle and, therefore, the engaging ends 152 come out from the engaging holes SCh of the support inner cylinder SC. When the handle 134 is further pulled up, as shown in FIG. 15, the cover 130, the cap upper body 140, and the engaging ring 150 move upward, and when the engaging catch 172c of the cap lower body 170 engages with the engaging surface 164b of the cap linking body 160, the cap lower body 170 is also pulled up as a unit with the above-mentioned components. As a result, the cover 130 comes out from the filler neck FN, and the tank can be filled through the filling opening SCc of the support inner cylinder SC.

(11) Closing of Fuel Cap 120

In order to close the filling opening SCc with the fuel cap 120, the user holds the handle 134 and inserts the fuel cap 120 from the lower end thereof into the filling opening SCc. The engaging ends 152, 152 of the engaging ring 150 are pushed by the inner wall of the support inner cylinder SC, the engaging ring 150 deforms and moves downward inside the support inner cylinder SC. The cover 130 is then inserted so as to curve in the center of the cover 130 as shown in FIG. 1, and when the engaging ends 152, 152 reach the engaging holes SCh, SCh of the support inner cylinder SC, the original shape of engaging ring 150 is restored by elastic forces and the engaging ends 152, 152 is thrust into the engaging holes SCh, SCh. As a result the fuel cap 120 is attached to the filler neck FN. At this time, the force that pushes the cap linking body 160 compresses the spring 190, and the sealing edge 176b is moved downward by the pressing force, thereby sealing the gasket GS.

(12) Operation Effect of Fueling Device 100

Because the cover 130 is attached to the upper part of the filler neck FN by a strong elastic force, the cover cannot be easily opened even by a large external force produced, for example, if the vehicle rolls over, and loss of sealing property due to separation of cover 130 is prevented.

When the handle 134 is pulled out, the cap 120 with the cover 130 can be easily taken off due to elastic deformation of the engaging ring 150, which means excellent operation ability.

The present invention is not limited to the above-described embodiments and can be implemented in a variety of forms, without departing from the essence thereof. For example, the following modifications are possible.

Figure 16:
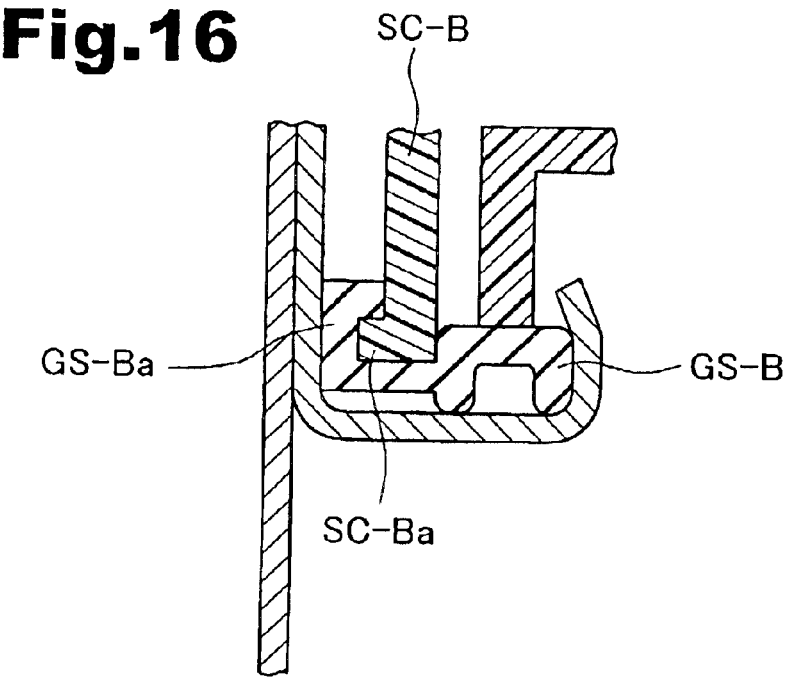
FIG. 16 is a cross-sectional view illustrating the periphery of the gasket of a first modification.
Figure 17:
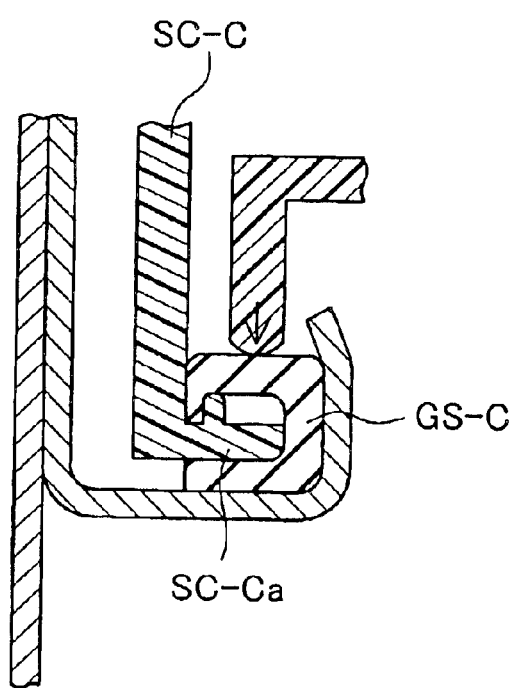
FIG. 17 is a cross-sectional view illustrating the periphery of the gasket of a second modification.
Figure 18:
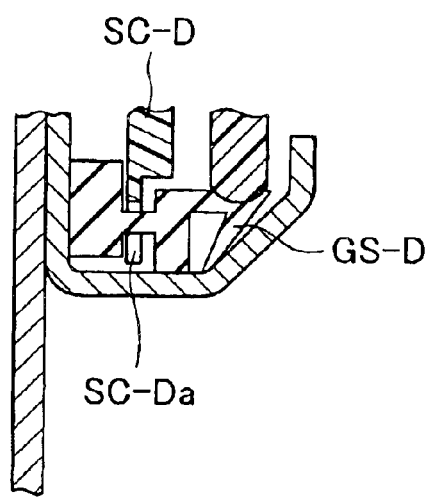
FIG. 18 is a cross-sectional view illustrating the periphery of the gasket of a third modification.

(1) FIGS. 16 through 18 illustrate an embodiment in which the gasket is mounted on the lower end of a support inner cylinder. Referring to FIG. 16, a mounting protrusion SC-Ba protruding outwardly is formed at the lower end of a support inner cylinder SC-B, and a gasket GS-B comprises a support portion GS-Ba formed at the side end of the gasket GS-B which surrounds the mounting protrusion SC-Ba Thus attaching the gasket GS-B to the lower end of support inner cylinder SC-B allows the gasket GS-B to be removed as a unit by pulling out the support inner cylinder SC-B, thereby facilitating mounting and maintenance of gasket GS-B. Further, a mounting protrusion SC-Ca protruding inwardly at the lower end of support inner cylinder SC-C, as shown in FIG. 17, or a coupling groove SC-Da obtained by cutting out part of the lower end of support inner cylinder SC-D, as shown in FIG. 18, may be formed as the gasket mounting elements, and gaskets GS-C, GS-D having a shape conforming thereto may be mounted.

Figure 19:
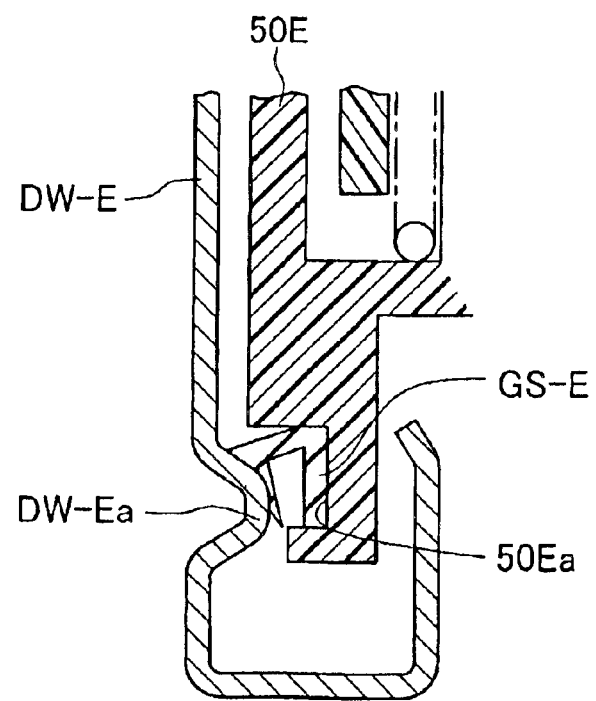
FIG. 19 is a cross-sectional view illustrating the periphery of the gasket of a fourth modification.
Figure 20:
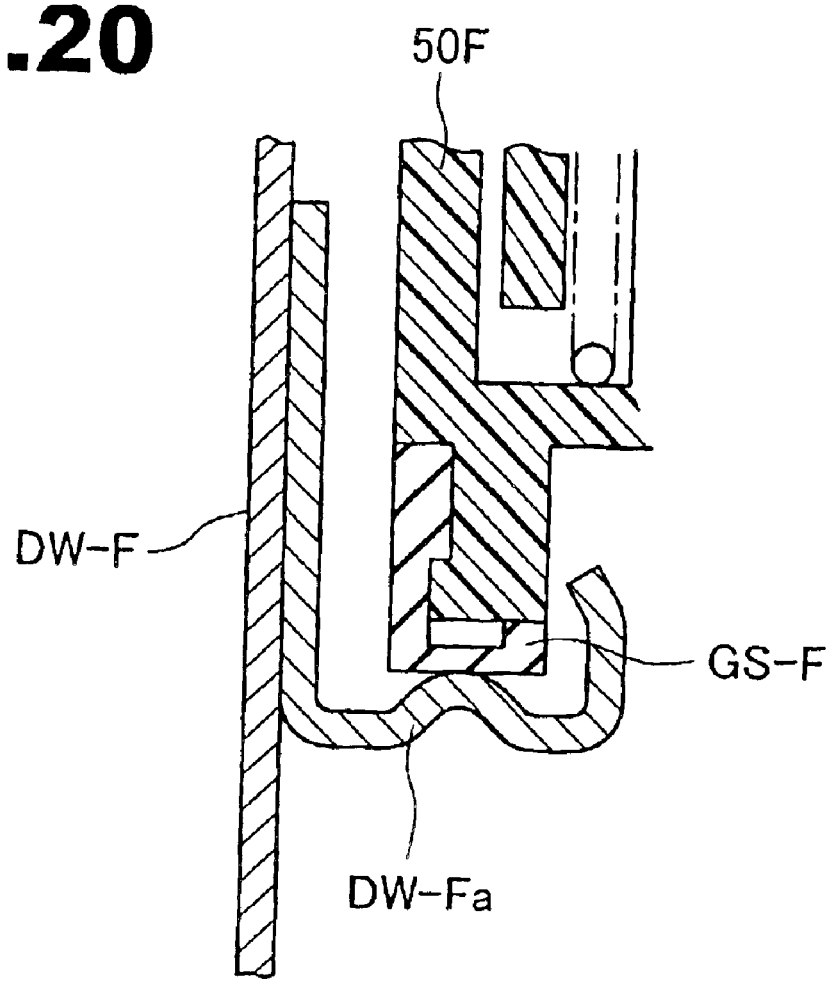
FIG. 20 is a cross-sectional view illustrating the periphery of the gasket of a fifth modification.

(2) FIGS. 19 and 20 illustrate an embodiment in which a gasket is mounted on the lower end of fuel cap. Referring to FIG. 19, a support recess 50Ea is formed on the outer periphery of the lower end of a cap lower body 50E and the gasket GS-E is fit into a support recess 50Ea. In addition, a ring-shaped sealing protrusion DW-Ea is formed inwardly from the surface of a dividing wall DW-E. With such a structure, pushing the gasket GS-E against the sealing protrusion DW-Ea provides a seal therebetween.

Further, as shown in FIG. 20, a gasket GS-F may be installed from the outer periphery of the lower end and over the lower surface of a cap lower body 50F and the lower surface of gasket GS-F may be pushed against a sealing protrusion DW-Fa of the upper wall of a dividing wall DW-F.

Figure 21:
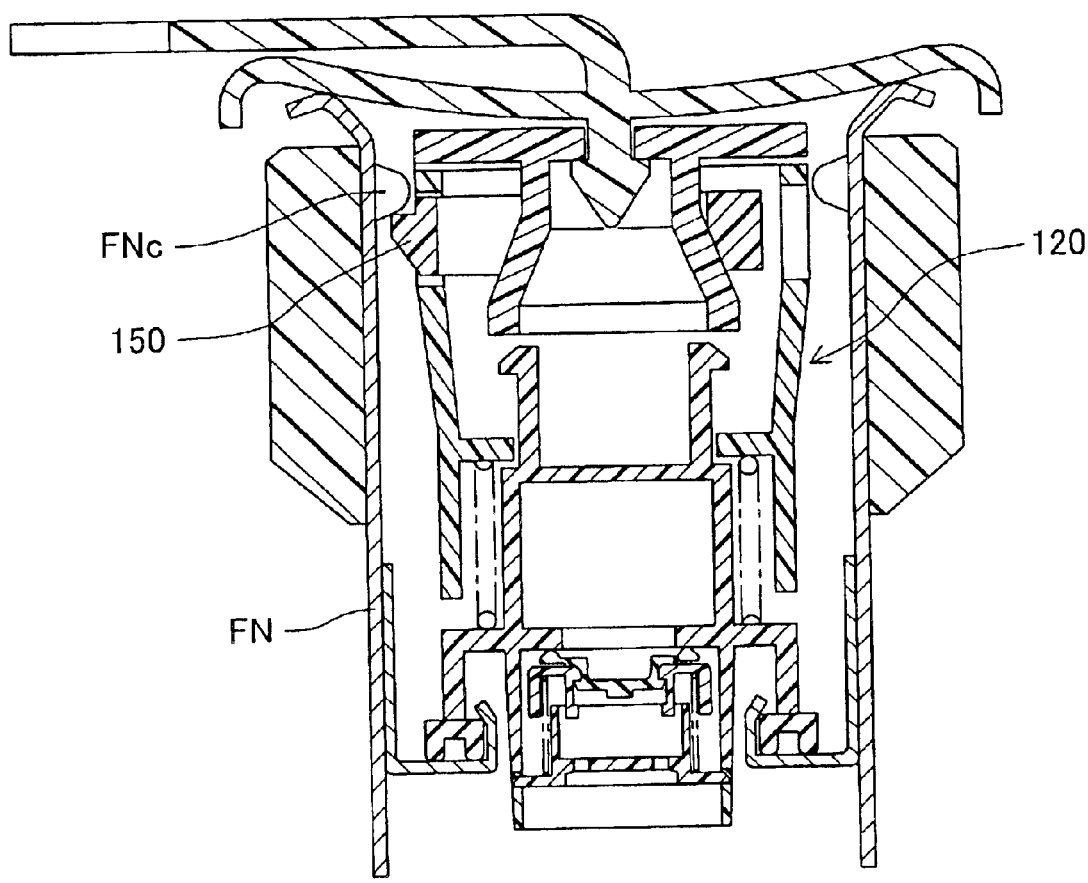
FIG. 21 is a cross-sectional view illustrating the fueling device of another embodiment.

(3) FIG. 21 illustrates a modification of a second embodiment. A specific feature of the modification is that the support inner cylinder shown in FIG. 9 is discarded. Thus, a fuel cap 120 is inserted into the inner space of the filler neck FN. The engaging ring 150 of the fuel cap 120 directly engages with a locking projection FNc of the filler neck FN. With such a structure, the support inner cylinder can be discarded and the number of parts can be reduced.

(2) Various types of joints may be used, provided that the fuel tank is connected to the outside. For example, joints to inlet pipes for supplying fuel can be used.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fueling device for fueling a fuel tank through an inlet disposed in a fuel passage of a fuel inlet pipe, the fueling device comprising:
   a cover having a handle being operable to open and close the inlet, the cover configured to open and close the inlet via operation of the handle, wherein the cover includes a plate that is pivotally connected to the inlet pipe;
   a sealing component located to cooperate with a seat surface inside the fuel inlet pipe;
   a cap configured to be detachably attached inside the inlet pipe, wherein the cap is adapted to be inserted into and taken out of the fuel inlet pipe as a whole, and an upper portion of the cap includes an arcuate surface, wherein the arcuate surface is configured to be pressed by the cover, and wherein the cap is further configured to press the sealing component against the seat surface when the cap is pressed by a closing force applied by the cover in a closing direction;
   a support inner cylinder disposed in the fuel inlet pipe, wherein the support inner cylinder is configured to support the cap; and
   a pressing mechanism, wherein the pressing mechanism includes a spring that is configured to transmit the closing force of the cover to the sealing component via the cap.

2. The fueling device as claimed in claim 1, wherein the handle includes an operation lever, wherein the operation lever is configured to be set in a closing position, to engage with the fuel inlet pipe in such a state that the operation lever is pressed against force of the spring, and an opening position, to release engagement with the fuel inlet pipe.

3. The fueling device according to claim 1, wherein the cap includes a cap upper body for receiving the closing force on the cover and a cap lower body for pressing the sealing component, wherein the spring is configured to transmit the closing force applied to the cap upper body to the cap lower body, and wherein the cap lower body includes a cap linking body, and the cap linking body is configured to support the spring against the cap upper body and to link the cap upper body to the cap lower body within a predetermined distance, and the cap includes a valve chamber and a pressure regulating valve located in the valve chamber, wherein the pressure regulating valve regulates the pressure in the fuel tank in a predetermined range.

4. The fueling device according to claim 1, wherein the support inner cylinder holds the seal component.

5. A fueling device for fueling a fuel tank through an inlet disposed in a fuel passage of a fuel inlet pipe, the fueling device comprising:
   a cover having a handle that is operable to open and close the inlet, wherein the cover is configured to open and close the inlet via operation of the handle;
   a sealing component located between the cap and a seat surface inside the fuel inlet pipe;
   a cap configured to be detachably attached inside the inlet pipe, wherein the cap includes a cap upper body, which receives a closing force from the cover, and a cap lower body, which presses the sealing component, wherein, the cap is adapted to be inserted into and taken out of the fuel inlet pipe as a whole, and wherein the cap is configured to press the sealing component against the seat surface when the cap is pressed by the closing force, which is applied by the cover in a closing direction;
   a spring located between the cap upper body and the cap lower body, wherein the spring presses the scaling component against the sealing surface when compressed in response to the closing force of the cover; and
   an engagement ring including engagement elements for engaging with the fuel inlet pipe, the engagement elements being configured to take a sealing position and a non-sealing position, the sealing position being a position in which the cap lower body applies force to the sealing component to create a seal, the non-scaling position being a position in which the cap lower body releases the seal, wherein the engagement ring includes a connection and connecting the engagement elements, the engagement ring being configured to deform from an elliptical shape to a ring shape when the engagement clement is attached to and detached from the fuel inlet pipe in response to a movement of the cap upper body.

6. The fueling device as claimed in claim 5, wherein the cover is configured to elastically deform and is held in intimate contact with a circumference of the inlet when the cover is attached to the inlet pipe.

7. The fueling device as claimed in claim 5, wherein the cover is configured to be held on a circumference of the inlet when the cap upper body is pressed by the cover and the engagement ring is set in the scaling position.

8. The fueling device in accordance with claim 5, wherein the cover is configured to unitarily connect with the cap.

9. The fueling device according to claim 5, Wherein the support inner cylinder holds the seal component.

10. The fueling device according to claim 5, wherein the sealing position is a position in which the cap lower body presses the sealing component against the sealing surface, and the non-sealing position is a position an which the cap lower body releases the sealing component from the sealing surface.

* * * * *